(12) United States Patent
Sasaki et al.

(10) Patent No.: US 12,742,057 B2
(45) Date of Patent: Sep. 22, 2026

(54) BORON NITRIDE PARTICLES, RESIN COMPOSITION, AND METHOD FOR PRODUCING RESIN COMPOSITION

(71) Applicant: Denka Company Limited, Tokyo (JP)

(72) Inventors: Yusuke Sasaki, Tokyo (JP); Kenji Miyata, Tokyo (JP); Michiharu Nakashima, Tokyo (JP)

(73) Assignee: Denka Company Limited, Tokyo (JP)

(*) Notice: Subject to any disclaimer, the term of this patent is extended or adjusted under 35 U.S.C. 154(b) by 763 days.

(21) Appl. No.: 18/041,901

(22) PCT Filed: Aug. 19, 2021

(86) PCT No.: PCT/JP2021/030448
§ 371 (c)(1),
(2) Date: Feb. 16, 2023

(87) PCT Pub. No.: WO2022/039237
PCT Pub. Date: Feb. 24, 2022

(65) Prior Publication Data

US 2023/0323090 A1 Oct. 12, 2023

(30) Foreign Application Priority Data

Aug. 20, 2020 (JP) ................................ 2020-139485

(51) Int. Cl.
*C08K 7/24* (2006.01)
*C01B 21/064* (2006.01)
*C09C 3/04* (2006.01)

(52) U.S. Cl.
CPC .............. *C08K 7/24* (2013.01); *C01B 21/064* (2013.01); *C09C 3/041* (2013.01);
(Continued)

(58) Field of Classification Search
CPC ............... C01B 21/064; C01P 2004/13; C01P 2004/133; C01P 2004/34; C01P 2004/82;
(Continued)

(56) References Cited

U.S. PATENT DOCUMENTS

2013/0012621 A1 1/2013 Yamamoto et al.
2019/0276310 A1 9/2019 Liu et al.
(Continued)

FOREIGN PATENT DOCUMENTS

CN 108545708 A * 9/2018 ........... C01B 21/064
JP 2008-007699 A 1/2008
(Continued)

OTHER PUBLICATIONS

Bechelany (Boron nitride multiwall nanotubes decorated with BN nanosheets, CrystEngComm, 2011, 13, pp. 6526-6530).*
(Continued)

*Primary Examiner* — Brieann R Johnston
(74) *Attorney, Agent, or Firm* — Leydig, Voit & Mayer, Ltd.

(57) ABSTRACT

A boron nitride particle having a shell part formed of boron nitride and a hollow part surrounded by the shell part, in which a density of the boron nitride on an inside of the shell part is higher than a density of the boron nitride on an outside of the shell part. A resin composition containing the boron nitride particle and a resin. A method for producing a resin composition including a step of preparing the boron nitride particle and a step of mixing the boron nitride particle with a resin.

5 Claims, 3 Drawing Sheets

(52) U.S. Cl.
CPC ...... *C01P 2002/72* (2013.01); *C01P 2004/03* (2013.01); *C01P 2004/133* (2013.01); *C01P 2004/84* (2013.01)

(58) Field of Classification Search
CPC .............. C01P 2004/84; C01P 2004/86; C01P 2004/88; C08K 2003/385
See application file for complete search history.

(56) References Cited

U.S. PATENT DOCUMENTS

| | | | | |
|---|---|---|---|---|
| 2019/0292051 | A1 | 9/2019 | Taylor et al. | |
| 2019/0352180 | A1* | 11/2019 | Daiki | C08K 3/22 |

FOREIGN PATENT DOCUMENTS

| | | | |
|---|---|---|---|
| JP | 2009-155176 | A | 7/2009 |
| JP | 2016-076586 | A | 5/2016 |
| JP | 2016-160134 | A | 9/2016 |
| WO | WO 2014/003193 | A1 | 1/2014 |
| WO | WO 2020/031883 | A1 | 2/2020 |

OTHER PUBLICATIONS

Zhi (Large-Scale Fabrication of Boron Nitride Nanosheets and Their Utilization in Polymeric Composites with Improved Thermal and Mechanical Properties. Adv. Mater. 2009, 21, pp. 2889-2893).*
Machine translation of CN 108545708 (2018, 6 pages).*
The International Bureau of WIPO, International Preliminary Report on Patentability in International Application No. PCT/JP2021/030448 (Mar. 2, 2023).
Japan Patent Office, International Search Report issued in International Application No. PCT/JP2021/030448 (Sep. 14, 2021).
State Intellectual Property Office, Office Action issued in Chinese Patent Application No. 202180038570.8 (Oct. 27, 2023).

* cited by examiner

BORON NITRIDE PARTICLES, RESIN COMPOSITION, AND METHOD FOR PRODUCING RESIN COMPOSITION

CROSS-REFERENCE TO RELATED APPLICATIONS

This patent application is the U.S. national phase of International Application No. PCT/JP2021/030448, filed on Aug. 19, 2021, which claims the benefit of Japanese Patent Application No. 2020-139485, filed Aug. 20, 2020, the disclosures of which are incorporated herein by reference in their entireties for all purposes.

TECHNICAL FIELD

The present disclosure relates to boron nitride particles, a resin composition, and a method for producing a resin composition.

BACKGROUND ART

Boron nitride has lubricity, high thermal conductivity and insulating properties and is in use for a variety of uses such as solid lubricating materials, releasing materials, cosmetic raw materials, heat dissipation materials and sintered products having heat resistance and insulating properties.

For example, as a hexagonal boron nitride powder that is loaded into a resin to be capable of imparting high thermal conductivity and high dielectric strength to a resin composition to be obtained, Patent Literature 1 discloses a hexagonal boron nitride powder in which an agglomerated particle composed of the primary particles of hexagonal boron nitride is contained, the BET specific surface area is 0.7 to 1.3 $m^2/g$ and an oil absorption that is measured based on JIS K 5101-13-1 is 80 g/100 g or less.

CITATION LIST

Patent Literature

[Patent Literature 1] Japanese Unexamined Patent Publication No. 2016-160134

SUMMARY OF INVENTION

Technical Problem

A main objective of the present invention is to provide a new boron nitride particle.

Solution to Problem

One aspect of the present invention is a boron nitride particle having a shell part formed of boron nitride and a hollow part surrounded by the shell part, in which a density of the boron nitride on an inside of the shell part is higher than a density of the boron nitride on an outside of the shell part.

On the outside of the shell part, a plurality of boron nitride pieces may be irregularly disposed.

Still another aspect of the present invention is a resin composition containing the boron nitride particle and a resin.

Far still another aspect of the present invention is a method for producing a resin composition, including a step of preparing the boron nitride particle and a step of mixing the boron nitride particle with a resin. This method for producing a resin composition may further include a step of pulverizing the boron nitride particle.

Advantageous Effects of Invention

According to one aspect of the present invention, it is possible to provide a new boron nitride particle.

DESCRIPTION OF EMBODIMENTS

Figure 1:
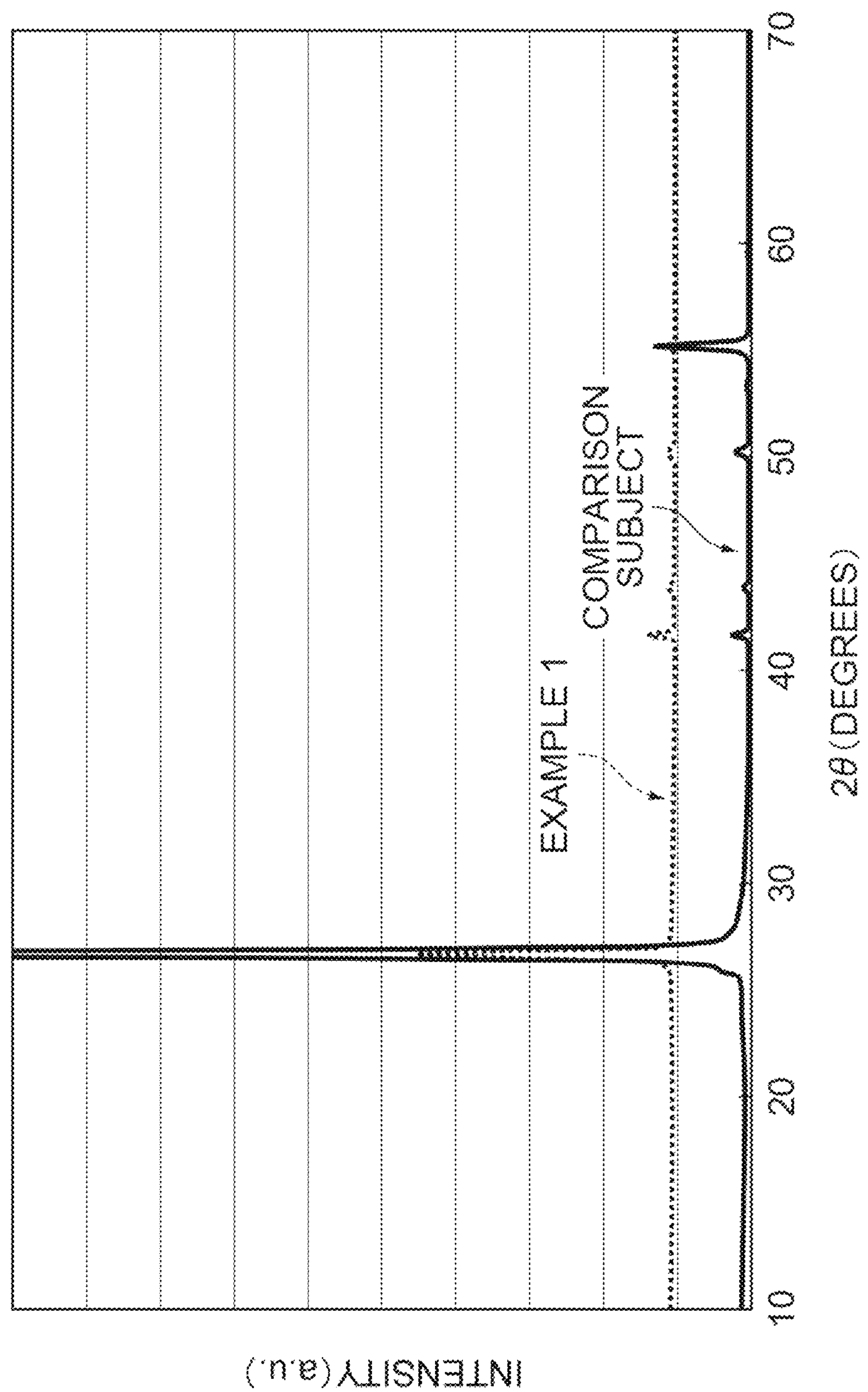
FIG. 1 is a graph of X-ray diffraction measurement results of boron nitride particles of Example 1.

Hereinafter, an embodiment of the present invention will be described in detail. One embodiment of the present invention is a boron nitride particle having a shell part formed of boron nitride; and a hollow part surrounded by the shell part. In other words, the boron nitride particle has a hollow shape.

The boron nitride particle according to one embodiment has a hollow part, whereby it is possible to reduce the weight compared with a solid boron nitride particle (for example, a conventional boron nitride particle formed by the agglomeration of the primary particles of boron nitride). In addition, for example, the boron nitride particle is mixed with a resin and used as a heat dissipation material (heat dissipation sheet), and, at this time, the boron nitride particle has the hollow part, whereby it is possible to load the resin that weighs less than boron nitride into the hollow part, which makes it possible to expect the weight reduction of the heat dissipation material compared with a case where a solid boron nitride particle (for example, a conventional boron nitride particle formed by the agglomeration of the primary particles of boron nitride) is used. Furthermore, the shell part of the boron nitride particle plays a role of thermal conduction, whereby it is also possible to achieve suitable thermal conductivity in the heat dissipation material. As the use of the boron nitride particle, the heat dissipation material has been exemplified, but the boron nitride particle can be used in a variety of uses without being limited to heat dissipation materials.

The hollow part may be formed along the external appearance shape of the boron nitride particle or may have a shape that is an approximately similar shape to the external appearance shape of the boron nitride particle. The fact that the boron nitride particle has the above-described hollow shape can be confirmed by observing the boron nitride particle with SEM.

The boron nitride particle may have a cross section where the area proportion of the hollow part in the total area of the shell part and the hollow part is 5% or more. The area proportion of the hollow part of the boron nitride particle can be obtained by importing a cross-sectional image (SEM image) of the boron nitride particle into image analyzing software (for example, “Mac-view” manufactured by Mountech Co., Ltd.) and calculating the area proportion. From the viewpoint of the weight reduction of a heat dissipation material when the boron nitride particle is used for the heat dissipation material, the boron nitride particle may have a cross section where the area proportion is 10% or more, 20% or more, 30% or more, 40% or more or 50% or more. The area proportion may be 90% or less or 80% or less. The thickness of the shell part may be 50 μm or less and is preferably 30 μm or less and more preferably 15 μm or less from the viewpoint of further reducing the weight of the boron nitride particle. The thickness of the shell part may be 1 μm or more or 3 μm or more from the viewpoint of easily maintaining the shape of the boron nitride particle even in a case where a molding pressure has been applied to the boron nitride particle at the time of, for example, molding a sheet-like heat dissipation material containing the boron nitride particle. The thickness of the shell part is defined as the average value of the thicknesses of the shell part at 10 arbitrary sites in the boron nitride particle in the cross-sectional image (SEM image) where the shell part and the hollow part of the boron nitride particle are included.

In the boron nitride particle, the density of the boron nitride on the inside of the shell part (on the hollow part side) is higher than the density of the boron nitride on the outside of the shell part (on the surface side of the boron nitride particle). The fact that the density of the boron nitride on the inside of the shell part is higher than the density of the boron nitride on the outside of the shell part can be confirmed by observing a cross section of the boron nitride particle with SEM.

In the boron nitride particle according to one embodiment, the density of the boron nitride on the outside of the shell part of the boron nitride particle is lower than the density of the boron nitride on the inside of the shell part, whereby the outside of the shell part is likely to deform preferentially compared with the inside of the shell part in a case where an external force has been applied to the boron nitride particle, and thus the external force is relaxed on the outside of the shell part, and the influence of the external force on the inside of the shell part (the deformation of the inside of the shell part by the external force) is suppressed. Therefore, for example, even in a case where a molding pressure has been applied to the boron nitride particles or the boron nitride particles have pushed each other at the time of molding a sheet-like heat dissipation material by mixing the boron nitride particles with a resin, it is possible to mold the heat dissipation material while the shapes of the boron nitride particles (particularly, the insides of the shell parts) are maintained. Therefore, the use of this boron nitride particle is considered to make it easy for the boron nitride particle to form a heat transfer path in the sheet-shape heat dissipation material and makes it possible to achieve suitable thermal conductivity.

In one embodiment, the shell part may be composed of a plurality of boron nitride pieces. The boron nitride piece is formed of boron nitride and may be a piece having, for example, a flaky shape. In this case, the length of the boron nitride piece in the longitudinal direction may be, for example, 1 μm or longer and may be 10 μm or shorter. On the inside of the shell part, the plurality of boron nitride pieces may be disposed so as to overlap each other. On the outside of the shell part, the plurality of boron nitride pieces may be irregularly disposed. The plurality of boron nitride pieces that compose the shell part may be in physical contact with each other or may chemically bond to each other.

The plurality of boron nitride pieces may be disposed more irregularly on the outside of the shell part than on the inside of the shell part (the plurality of boron nitride pieces may be disposed more regularly on the inside of the shell part than on the outside of the shell part). There may be a larger number of voids between the boron nitride pieces on the outside of the shell part than on the inside of the shell part (there may be a smaller number of voids between the boron nitride pieces on the inside of the shell part than on the outside of the shell part). The contact area between the plurality of boron nitride pieces may be smaller on the outside of the shell part than on the inside of the shell part (the contact area between the plurality of boron nitride pieces may be larger on the inside of the shell part than on the outside of the shell part).

The density of the boron nitride is high on the inside of the shell part, which makes it possible for the strength of the boron nitride particle to improve. Therefore, for example, when a heat dissipation material has been produced by mixing the boron nitride particles with a resin, it is considered that the boron nitride particles are less likely to collapse even in the case of overlapping each other and thus the thermal conductivity of the heat dissipation material can be improved.

When the density of the boron nitride is low (particularly, when the boron nitride pieces are irregularly disposed) on the outside of the shell part, the number of contact points between the boron nitride particles increase. Therefore, for example, when a heat dissipation material has been produced by mixing the boron nitride particles with a resin, since there are a large number of contact points between the boron nitride particles, it is considered that it becomes easy to form a heat transfer path between the boron nitride particles and thus the thermal conductivity of the heat dissipation material can be improved.

The boron nitride particle may have a long and thin shape. The aspect ratio of the boron nitride particle may be 1.2 or more, 1.3 or more, 1.4 or more, 1.5 or more, 2.0 or more, 3.0 or more, 5.0 or more or 7.0 or more and may be 10.0 or less, 9.5 or less, 9.0 or less or 8.0 or less.

The aspect ratio is defined as the ratio ($L_1/L_2$) of the maximum length (the maximum length in the longitudinal direction) $L_1$ of the boron nitride particle to the maximum length of the boron nitride particle in a direction perpendicular to a direction where the maximum length $L_1$ is present (longitudinal direction) (lateral direction) (the maximum length in the lateral direction) $L_2$ of the boron nitride particle. The maximum length of the boron nitride particle means the length of the maximum one of direct distances between two arbitrary points on one boron nitride particle when the boron nitride particle is observed with a scanning electron microscope (SEM). The maximum length may be measured by importing an observation image (SEM image) into image analyzing software (for example, "Mac-view" manufactured by Mountech Co., Ltd.).

As the aspect ratio of the boron nitride particle increases, the shape of the boron nitride particle becomes longer and thinner. Therefore, for example, when a heat dissipation material has been produced by mixing the boron nitride particles with a resin, it is possible to improve the thermal conductivity of the boron nitride particles in the longitudinal direction. In addition, in the heat dissipation material, the boron nitride particles are likely to overlap each other. Furthermore, when a boron nitride particle overlaps another boron nitride particle, it is considered that the boron nitride particle having a long and thin shape overlaps another so as to be inclined. Therefore, it is considered that the number of the boron nitride particles that are lined up in the thickness direction of the heat dissipation material becomes small, and heat transfer loss between the boron nitride particles becomes small, and thus the thermal conductivity of the heat dissipation material is superior.

The maximum length ($L_1$) of the boron nitride particle may be 15 μm or longer, 20 μm or longer, 25 μm or longer, 50 μm or longer, 80 μm or longer, 100 μm or longer, 125 μm or longer, 150 μm or longer or 200 μm or longer and may be 500 μm or shorter, 400 μm or shorter, 300 μm or shorter, 200 μm or shorter, 100 μm or shorter, 50 μm or shorter, 45 μm or shorter, 40 μm or shorter, 35 μm or shorter or 30 μm or shorter.

In a case where the maximum length of the boron nitride particle is large, it is considered that, when a heat dissipation material has been produced by, for example, mixing the boron nitride particles and a resin, the number of the boron nitride particles that are lined up in the thickness direction of the heat dissipation material becomes small, and heat transfer loss between the boron nitride particles becomes small, and thus the thermal conductivity of the heat dissipation material is superior.

In a case where the boron nitride particle has an open part, the open part may communicate with the hollow part. When the boron nitride particle has such an open part, for example, when the boron nitride particle is mixed with a resin and used as a heat dissipation material, the resin that weighs less than the boron nitride particle is loaded into the hollow part, whereby the weight reduction of the heat dissipation material can be expected while the heat dissipation material has thermal conductivity.

The plurality of boron nitride pieces may be disposed so as to stand perpendicular to the longitudinal direction of the boron nitride particle (for example, such that the longitudinal directions of the boron nitride pieces become approximately perpendicular to the longitudinal direction of the boron nitride particle) on the outside of the shell part of the boron nitride particle having a long and thin shape compared with the inside of the shell part. The plurality of boron nitride pieces may be disposed so as to lie along the longitudinal direction of the boron nitride particle (for example, such that the longitudinal directions of the boron nitride pieces become approximately parallel to the longitudinal direction of the boron nitride particle) on the inside of the shell part of the boron nitride particle having a long and thin shape compared with the outside of the shell part.

The boron nitride particle may have a fixed shape or an irregular shape. Examples of the external appearance shape of the boron nitride particle include an approximately spheroid shape, an approximately columnar shape (an approximately cylindrical shape, an approximately prismatic shape or the like) and the like. The boron nitride particle may have, for example, a branched structure that is branched in two or more directions.

The boron nitride particle may be substantially composed of boron nitride alone. The fact that the boron nitride particle is substantially composed of boron nitride alone can be confirmed from the fact that only a peak derived from boron nitride is detected in X-ray diffraction measurement.

In one embodiment, the boron nitride particle may be a boron nitride particle having an approximately columnar shape (hereinafter, also referred to as the columnar boron nitride particle). In the present specification, a direction from one end toward the other end of the columnar boron nitride particle is regarded as an axial direction, a direction perpendicular to the axial direction is regarded as a radial direction, the magnitude of the boron nitride particle in the axial direction is regarded as the height, and the magnitude in the radial direction (the magnitude of the width of the boron nitride particle perpendicular to the axial direction) is regarded as the diameter. In the columnar boron nitride particle, the hollow part may have a shape that is an approximately similar shape to the external appearance shape of the boron nitride particle (approximately columnar shape), both ends in the axial direction may be all open ends, and the open end may communicate with the hollow part.

In a cross section in a direction perpendicular to the axial direction, the columnar boron nitride particle has a shell part formed of boron nitride and a hollow part surrounded by the shell part, and the density of the boron nitride on the inside of the shell part is higher than the density of the boron nitride on the outside of the shell part. The fact that the columnar boron nitride particle has such a configuration can be confirmed by observing the cross section with SEM.

In the cross section of the columnar boron nitride particle in the direction perpendicular to the axial direction, the area proportion of the hollow part in the total area of the shell part and the hollow part and the thickness of the shell part can be measured by the above-described measurement methods, and the area proportion of the hollow part in the total area of the shell part and the hollow part and the magnitude of the thickness of the shell part may be within the above-described ranges.

The maximum value of the height of the columnar boron nitride particle may be 15 μm or more, 20 μm or more, 25 μm or more, 50 μm or more, 80 μm or more, 100 μm or more, 125 μm or more, 150 μm or more or 200 μm or more and may be 500 μm or less, 400 μm or less, 300 μm or less, 200 μm or less, 100 μm or less, 50 μm or less, 45 μm or less, 40 μm or less, 35 μm or less or 30 μm or less.

The maximum value of the diameter of the columnar boron nitride particle may be 1 μm or longer, 2 μm or longer, 5 μm or longer, 10 μm or longer, 15 μm or longer, 20 μm or longer, 25 μm or longer, 30 μm or longer, 40 μm or longer or 50 μm or longer and may 300 μm or shorter, 200 μm or shorter, 150 μm or shorter, 100 μm or shorter, 80 μm or shorter, 70 μm or shorter or 60 μm or shorter.

The ratio between the maximum value of the height and the maximum value of the diameter of the columnar boron nitride particle (the maximum value of the height/the maximum value of the diameter) may be 0.3 or more, 0.5 or more, 0.7 or more, 1.0 or more, 1.2 or more, 1.3 or more, 1.4 or more, 1.5 or more, 2.0 or more, 3.0 or more, 5.0 or more or 7.0 or more and may be 10.0 or less, 9.5 or less, 9.0 or less, 8.0 or less, 7.0 or less, 5.0 or less, 3.0 or less, 2.5 or less, 2.0 or less, 1.5 or less, 1.2 or less, 1.0 or less, 0.7 or less or 0.5 or less.

The aspect ratio of the columnar boron nitride particle is small, whereby, for example, when a heat dissipation material has been produced by mixing the columnar boron nitride particles with a resin, it is possible to improve the loading properties of the boron nitride particles. In addition, since the strength of the boron nitride particle is excellent due to the fact that the density of the boron nitride is high on the inside of the shell part of the boron nitride particle, it is considered that the boron nitride particles are less likely to collapse even when overlapping each other. Therefore, improvement in the loading properties of the boron nitride particles in the heat dissipation material makes it easy to form a heat transfer path between the boron nitride particles, and thus it is considered that the thermal conductivity of the heat dissipation material can be improved.

Subsequently, a method for producing the above-described boron nitride particle will be described below. The boron nitride particle can be produced by, for example, a method for producing a boron nitride particle including a step of disposing a mixture and a base material in a container formed of a carbon material, in which the mixture includes boron carbide and boric acid, and the base material is formed of a carbon material (disposition step) and a step of generating a boron nitride particle on the base material by performing heating and pressurization with a nitrogen atmosphere formed in the container (generation step). Another embodiment of the present invention is such as producing method.

The container formed of a carbon material is a container capable of accommodating the mixture and the base material. The container may be, for example, a carbon crucible. The container is preferably a container airtightness of which can be enhanced by covering an open part with a lid. In the disposition step, for example, the mixture may be disposed on a bottom part of the container, and the base material may be disposed so as to be fixed to a side wall surface in the container or to the inside of the lid. The base material formed of a carbon material may have, for example, a sheet shape, a plate shape or a rod shape. The base material formed of a carbon material may be, for example, a carbon sheet (graphite sheet), a carbon plate or a carbon rod.

The boron carbide in the mixture may be, for example, in a powder form (boron carbide powder). The boric acid in the mixture may be, for example, in a powder form (boric acid powder). The mixture can be obtained by, for example, mixing a boron carbide powder and a boric acid powder by a well-known method.

The boron carbide powder can be produced by a well-known production method. Examples of the method for producing the boron carbide powder include a method in which boric acid and acetylene black are mixed together and then heated at 1800° C. to 2400° C. for one to 10 hours in an inert gas (for example, nitrogen gas) atmosphere, thereby obtaining a massive boron carbide particle. The boron carbide powder can be obtained by appropriately performing pulverization, shieving, washing, impurity removal, drying and the like on the massive boron carbide particle obtained by this method.

The average particle diameter of the boron carbide powder can be adjusted by adjusting the pulverization time of the massive boron carbide particle. The average particle diameter of the boron carbide powder may be 5 μm or more, 7 μm or more or 10 μm or more and may be 100 μm or less, 90 μm or less, 80 μm or less or 70 μm or less. The average particle diameter of the boron carbide powder can be measured by a laser diffraction and scattering method.

The mixing ratio between the boron carbide and the boric acid can be appropriately selected. From the viewpoint of the boron nitride particle being likely to become large, the content of the boric acid in the mixture is, with respect to 100 parts by mass of the boron carbide, preferably 2 parts by mass or more, more preferably 5 parts by mass or more and still more preferably 8 parts by mass or more and may be 100 parts by mass or less, 90 parts by mass or less or 80 parts by mass or less.

The mixture containing boron carbide and boric acid may further contain other components. Examples of the other components include silicon carbide, carbon, iron oxide and the like. When the mixture containing boron carbide and boric acid further contains silicon carbide, it becomes easy to obtain a boron nitride particle having no open end.

In the container, for example, a nitrogen atmosphere containing 95 vol % or more of nitrogen gas has been formed. The content of the nitrogen gas in the nitrogen atmosphere is preferably 95 vol % or more and more preferably 99.9 vol % or more and may be substantially 100 vol %. In the nitrogen atmosphere, not only the nitrogen gas but also ammonia gas or the like may be contained.

From the viewpoint of the boron nitride particle being likely to become large, the heating temperature is preferably 1450° C. or higher, more preferably 1600° C. or higher and still more preferably 1800° C. or higher. The heating temperature may be 2400° C. or lower, 2300° C. or lower or 2200° C. or lower.

From the viewpoint of the boron nitride particle being likely to become large, the pressure at the time of the pressurization is preferably 0.3 MPa or higher and more preferably 0.6 MPa or higher. The pressure at the time of the pressurization may be 1.0 MPa or lower or 0.9 MPa or lower.

From the viewpoint of the boron nitride particle being likely to become large, the time for performing the heating and the pressurization is preferably three hours or longer and more preferably five hours or longer. The time for performing the heating and the pressurization may be 40 hours or shorter or 30 hours or shorter.

According to this production method, boron nitride particles are generated on the base material formed of a carbon material. Therefore, boron nitride particles can be obtained by collecting the boron nitride particles on the base material. The fact that boron nitride particles are generated on the base material can be confirmed from the fact that a peak derived from boron nitride is detected when the particles generated on the base material are collected and X-ray diffraction measurement is performed on the collected particles.

A step of classifying the boron nitride particles obtained as described above so that only a boron nitride particle having a maximum length in a specific range can be obtained (classification step) may also be performed.

The boron nitride particle obtained as described above can be mixed with a resin and used as a resin composition. That is, an embodiment of the present invention is a resin composition containing the boron nitride particle and a resin.

The resin, for example, include an epoxy resin, a silicone resin, silicone rubber, an acrylic resin, a phenolic resin, a melamine resin, a urea resin, an unsaturated polyester, a fluorine resin, a polyimide, a polyamide-imide, polyetherimide, polybutylene terephthalate, polyethylene terephthalate, polyphenylene ether, polyphenylene sulfide, wholly aromatic polyester, polysulfone, a liquid crystal polymer, polyethersulfone, polycarbonate, a maleimide-modified resin, an ABS (acrylonitrile-butadiene-styrene) resin, an AAS (acrylonitrile-acrylic rubber styrene) resin, an AES (acrylonitrile ethylene propylene diene rubber styrene) resin and the like.

In the case of using the resin composition as a heat dissipation material, from the viewpoint of improving the thermal conductivity of the heat dissipation material and easily obtaining excellent heat dissipation performance, the content of the boron nitride particles may be 30 vol % or more, 40 vol % or more, 50 vol % or more or 60 vol % or more based on the total volume of the resin composition. From the viewpoint of suppressing the generation of voids at the time of molding the resin composition into a sheet-like heat dissipation material and being capable of suppressing the degradation of the insulating properties and mechanical strength of the sheet-like heat dissipation material, the content of the boron nitride particles may be 85 vol % or less, 80 vol % or less, 70 vol % or less, 60 vol % or less, 50 vol % or less or 40 vol % or less based on the total volume of the resin composition.

The content of the resin may be appropriately adjusted depending on the use, required characteristics or the like of the resin composition. The content of the resin may be, for example, 15 vol % or more, 20 vol % or more, 30 vol % or more, 40 vol % or more, 50 vol % or more or 60 vol % or more and may be 70 vol % or less, 60 vol % or less, 50 vol % or less or 40 vol % or less based on the total volume of the resin composition.

The resin composition may further contain a curing agent that cures the resin. The curing agent is appropriately selected depending on the kind of the resin. Examples of the curing agent that can be used together with an epoxy resin include phenol novolac compounds, acid anhydrides, amino compounds, imidazole compounds and the like.

The content of the curing agent may be, for example, 0.5 parts by mass or more or 1.0 part by mass or more and may be 15 parts by mass or less or 10 parts by mass or less with respect to 100 parts by mass of the resin.

The resin composition may further contain other components. The other components may be a curing accelerator (curing catalyst), a coupling agent, a wetting and dispersing additive, a surface conditioner and the like.

Examples of the curing accelerator (curing catalyst) include phosphorus-based curing accelerators such as tetraphenylphosphonium tetraphenylborate and triphenylphosphate, imidazole-based curing accelerators such as 2-phenyl-4,5-dihydroxymethylimidazole, amine-based curing accelerators such as boron trifluoride monoethylamine and the like.

Examples of the coupling agent include a silane-base coupling agent, a titanate-based coupling agent, an aluminate-based coupling agent and the like. Examples of a chemical bonding group that is contained in these coupling agents include a vinyl group, an epoxy group, an amino group, a methacrylic group, a mercapto group and the like.

Examples of the wetting and dispersing additive include phosphate ester salt, carboxylate ester, polyester, acrylic copolymers, block copolymers and the like.

Examples of the surface conditioner include an acrylic surface conditioner, a silicone-based surface conditioner, a vinyl-based surface conditioner, a fluorine-based surface conditioner and the like.

The resin composition can be produced by, for example, a method for producing a resin composition including a step of preparing the boron nitride particle according to one embodiment (preparation step) and a step of mixing the boron nitride particles with a resin (mixing step). Far still another embodiment of the present invention is such as method for producing a resin composition. In the mixing step, in addition to the boron nitride particle and the resin, the above-described curing agent or the other components may be further mixed therewith.

The method for producing a resin composition according to one embodiment may further include a step of pulverizing the boron nitride particle (pulverization step). The pulverization step may be performed between the preparation step and the mixing step or may be performed at the same time as the mixing step (the boron nitride particle may be pulverized at the same time as the mixing of the boron nitride particle with the resin).

The resin composition can be used as, for example, a heat dissipation material. The heat dissipation material can be produced by, for example, curing the resin composition. A method for curing the resin composition is appropriately selected depending on the kind of the resin (and the curing agent that is used as necessary) contained in the resin composition. For example, in a case where the resin is an epoxy resin and the above-described curing agent is used together, the resin can be cured by heating.

EXAMPLES

Hereinafter, the present invention will be more specifically described using examples. However, the present invention is not limited to the following examples.

Example 1

Massive boron carbide particles were pulverized with a pulverizer, and a boron carbide powder having an average particle diameter of 10 μm was obtained. 100 Parts by mass of the obtained boron carbide powder and 9 parts by mass of boric acid were mixed together and loaded into a carbon crucible, an open part of the carbon crucible was covered with a carbon sheet (manufactured by NeoGraf Solutions), and the carbon sheet was sandwiched by a lid of the carbon crucible and the carbon crucible to fix the carbon sheet. The carbon crucible covered with the lid was heated in a nitrogen gas atmosphere under conditions of 2000° C. and 0.85 MPa for 20 hours in a resistance heating furnace, whereby particles were generated on the carbon sheet.

As a result of collecting the particles generated on the carbon sheet and measuring the collected particles using an X-ray diffractometer ("ULTIMA-IV" manufactured by Rigaku Corporation), only a peak derived from boron nitride was detected, and it was possible to confirm that boron nitride particles were obtained. The X-ray diffraction measurement result of the obtained boron nitride particles and the X-ray diffraction measurement result of a boron nitride powder (GP grade) manufactured by Denka Company Limited as a comparison subject are each shown in FIG. 1.

Figure 2:
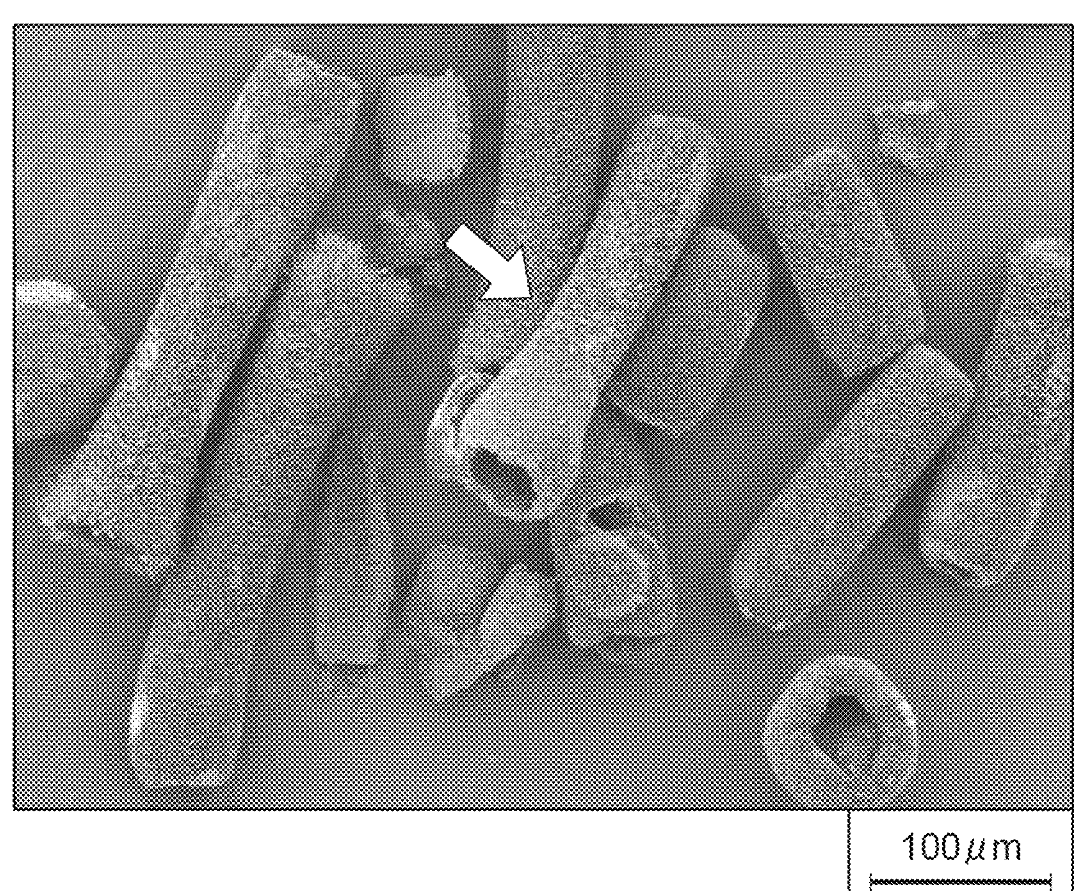
FIG. 2 is a SEM image of the boron nitride particles of Example 1.
Figure 3:
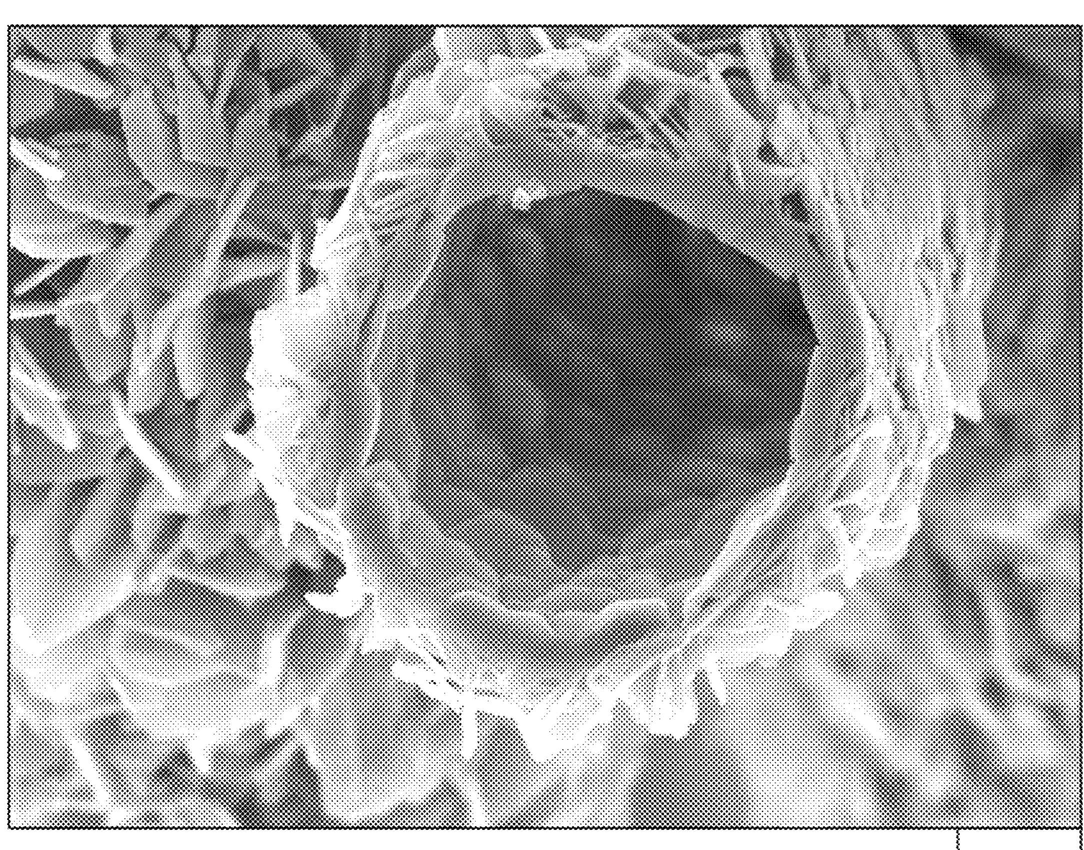
FIG. 3 is a SEM image of a cross section of a boron nitride particle of Example 1.

A SEM image of the obtained boron nitride particles is shown in FIG. 2. One of the obtained boron nitride particles having a hollow shape (a boron nitride particle indicated by an arrow in FIG. 2) had a maximum length of 218 μm and an aspect ratio of 3.1. In addition, a SEM image of a cross section of the obtained boron nitride particle perpendicular to the longitudinal direction observed with SEM is shown in FIG. 3. As is clear from FIG. 3, it was possible to confirm that this boron nitride particle had a shell part formed of boron nitride and a hollow part surrounded by the shell part and the density of the boron nitride on the inside of the shell part was higher than the density of the boron nitride on the outside of the shell part. In the boron nitride particle, the cross section of which was observed with SEM, the area proportion of the hollow part in the total area of the shell part and the hollow part was 53%, and the thickness of the shell part was 3.2 μm.

The invention claimed is:

1. A boron nitride particle, having:
a shell part formed of boron nitride; and
a hollow part surrounded by the shell part,
wherein a density of the boron nitride on an inside of the shell part is higher than a density of the boron nitride on an outside of the shell part,
wherein a thickness of the shell part is 1 μm or more, and
wherein a maximum length of the boron nitride particle is 125 μm or more.

2. The boron nitride particle according to claim 1,
wherein a plurality of boron nitride pieces is irregularly disposed on the outside of the shell part.

3. A resin composition comprising:
the boron nitride particle according to claim 1; and
a resin.

4. A method for producing a resin composition, comprising:

a step of preparing the boron nitride particle according to claim 1; and a step of mixing the boron nitride particle with a resin.

5. The method for producing a resin composition according to claim 4, further comprising:

a step of pulverizing the boron nitride particle.

* * * * *